United States Patent
Edge et al.

(10) Patent No.: US 9,198,053 B2
(45) Date of Patent: Nov. 24, 2015

(54) POSITIONING USING ENHANCED PILOT SIGNAL

(71) Applicant: QUALCOMM Incorporated, San Diego, CA (US)

(72) Inventors: Stephen William Edge, Escondido, CA (US); Peter John Black, San Diego, CA (US); Qiang Wu, San Diego, CA (US); Wanlun Zhao, San Diego, CA (US); Yeliz Tokgoz, San Diego, CA (US); Roberto Padovani, San Diego, CA (US); Ayman Fawzy Naguib, Cupertino, CA (US); Je Woo Kim, Cupertino, CA (US); Pranav Dayal, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/852,574

(22) Filed: Mar. 28, 2013

(65) Prior Publication Data

US 2013/0217401 A1     Aug. 22, 2013

Related U.S. Application Data

(63) Continuation of application No. 12/259,253, filed on Oct. 27, 2008, now Pat. No. 8,412,227, which is a continuation-in-part of application No. 12/113,900, filed on May 1, 2008.

(Continued)

(51) Int. Cl.
*H04W 24/00*     (2009.01)
*G01S 5/02*     (2010.01)
*H04W 64/00*     (2009.01)

(52) U.S. Cl.
CPC .............. *H04W 24/00* (2013.01); *G01S 5/0226* (2013.01); *G01S 5/0236* (2013.01); *H04W 64/00* (2013.01)

(58) Field of Classification Search
CPC .... H04W 64/00; H04W 24/00; G01S 5/0236; G01S 5/0226
USPC ................ 455/456.1–456.6, 450, 403, 404.1, 455/404.2
See application file for complete search history.

(56) References Cited

U.S. PATENT DOCUMENTS

| | | | |
|---|---|---|---|
| 4,829,593 A | 5/1989 | Hara | |
| 5,900,838 A | 5/1999 | Khan et al. | |

(Continued)

FOREIGN PATENT DOCUMENTS

| | | |
|---|---|---|
| CN | 1257387 A | 6/2000 |
| CN | 1419752 A | 5/2003 |

(Continued)

OTHER PUBLICATIONS

International Search Report and Written Opinion—PCT/US2008/082107, International Search Authority—European Patent Office—Feb. 26, 2009.

(Continued)

*Primary Examiner* — Ajit Patel
(74) *Attorney, Agent, or Firm* — Linda G. Gunderson

(57) ABSTRACT

Briefly, in accordance with one embodiment, a method of transmitting signals is provided. Signal waveforms are transmitted from at least two respective sectors. The at least two respective sectors are from at least two different sets of a superset of sectors. The transmitted signal waveforms include signal waveforms at least nearly mutually orthogonal at least along a particular signal dimension. An advantage of such an embodiment, for example, is reduced signal interference.

29 Claims, 13 Drawing Sheets

Related U.S. Application Data

(60) Provisional application No. 61/016,101, filed on Dec. 21, 2007, provisional application No. 60/939,035, filed on May 18, 2007, provisional application No. 60/978,068, filed on Oct. 5, 2007, provisional application No. 61/014,706, filed on Dec. 18, 2007, provisional application No. 61/038,660, filed on Mar. 21, 2008.

(56) References Cited

U.S. PATENT DOCUMENTS

| | | |
|---|---|---|
| 5,970,414 A | 10/1999 | Bi et al. |
| 5,974,323 A | 10/1999 | Doner |
| 6,021,330 A | 2/2000 | Vannucci |
| 6,295,024 B1 | 9/2001 | King et al. |
| 6,329,948 B1 | 12/2001 | Ishikawa |
| 6,353,744 B1 | 3/2002 | Wu et al. |
| 6,493,331 B1 | 12/2002 | Walton et al. |
| 6,545,997 B1 | 4/2003 | Boehnke et al. |
| 6,590,881 B1 | 7/2003 | Wallace et al. |
| 6,831,957 B2 | 12/2004 | Chen |
| 6,888,805 B2 | 5/2005 | Bender et al. |
| 7,016,692 B2 | 3/2006 | Rajkotia |
| 7,068,683 B1 | 6/2006 | Lundby et al. |
| 7,471,241 B1 | 12/2008 | Yang |
| 7,519,136 B2 | 4/2009 | Qi et al. |
| 7,528,772 B2 | 5/2009 | Ruutu et al. |
| 7,565,125 B2 | 7/2009 | Audinot et al. |
| 7,570,962 B2 | 8/2009 | Chou |
| 7,580,482 B2 | 8/2009 | Endres et al. |
| 7,721,236 B2 | 5/2010 | Hwang et al. |
| 7,893,873 B2 | 2/2011 | Black et al. |
| 7,990,317 B2 | 8/2011 | Davis et al. |
| 8,068,056 B2 | 11/2011 | Wachter et al. |
| 8,094,595 B2 | 1/2012 | Montojo et al. |
| 8,174,446 B2 | 5/2012 | Davis et al. |
| 8,326,318 B2 | 12/2012 | Attar et al. |
| 8,412,227 B2 | 4/2013 | Edge et al. |
| 8,514,988 B2 | 8/2013 | Wu et al. |
| 2001/0034236 A1 | 10/2001 | Tong et al. |
| 2002/0025822 A1 | 2/2002 | Hunzinger |
| 2002/0065075 A1* | 5/2002 | Kangas et al. ............ 455/423 |
| 2002/0183075 A1 | 12/2002 | Fauconnier |
| 2003/0026225 A1 | 2/2003 | Ogino et al. |
| 2003/0112857 A1 | 6/2003 | Cleveland |
| 2003/0214908 A1 | 11/2003 | Kumar et al. |
| 2004/0067759 A1 | 4/2004 | Spirito et al. |
| 2004/0072579 A1 | 4/2004 | Hottinen |
| 2004/0092233 A1 | 5/2004 | Rudrapatna |
| 2004/0132443 A1 | 7/2004 | Klein et al. |
| 2004/0135721 A1 | 7/2004 | Hoven et al. |
| 2004/0151264 A1 | 8/2004 | Montojo et al. |
| 2004/0166873 A1 | 8/2004 | Simic et al. |
| 2004/0203921 A1 | 10/2004 | Bromhead et al. |
| 2005/0046613 A1 | 3/2005 | Ruutu et al. |
| 2005/0054349 A1 | 3/2005 | Balachandran et al. |
| 2005/0062530 A1 | 3/2005 | Bardsley et al. |
| 2005/0101277 A1 | 5/2005 | Narayan et al. |
| 2005/0186948 A1 | 8/2005 | Gallagher et al. |
| 2005/0232199 A1 | 10/2005 | Liu et al. |
| 2006/0079193 A1 | 4/2006 | Sato et al. |
| 2006/0199577 A1 | 9/2006 | Ramakrishna et al. |
| 2006/0209670 A1 | 9/2006 | Gorokhov et al. |
| 2006/0280200 A1 | 12/2006 | Lane et al. |
| 2007/0004430 A1 | 1/2007 | Hyun et al. |
| 2007/0063897 A1* | 3/2007 | Matsuda ............ 342/463 |
| 2007/0135170 A1 | 6/2007 | Khan et al. |
| 2007/0149217 A1 | 6/2007 | Balachandran et al. |
| 2007/0189282 A1 | 8/2007 | Lohr et al. |
| 2007/0229355 A1 | 10/2007 | Han et al. |
| 2007/0298793 A1 | 12/2007 | Dawson |
| 2008/0132247 A1 | 6/2008 | Anderson |
| 2008/0151743 A1 | 6/2008 | Tong et al. |
| 2008/0161011 A1* | 7/2008 | Babin et al. .............. 455/456.1 |
| 2008/0267137 A1 | 10/2008 | Dabak et al. |
| 2009/0003495 A1 | 1/2009 | Wu et al. |
| 2009/0124265 A1 | 5/2009 | Black et al. |
| 2009/0280836 A1 | 11/2009 | Chou |
| 2010/0105405 A1 | 4/2010 | Vujcic |
| 2011/0111751 A1 | 5/2011 | Markhovsky et al. |
| 2013/0065610 A1 | 3/2013 | Attar et al. |
| 2014/0029705 A1 | 1/2014 | Wu et al. |
| 2014/0038645 A1 | 2/2014 | Wu et al. |
| 2014/0064243 A1* | 3/2014 | Ma et al. ............ 370/330 |

FOREIGN PATENT DOCUMENTS

| | | |
|---|---|---|
| CN | 1926445 A | 3/2007 |
| EP | 0893920 A2 | 1/1999 |
| EP | 0893930 A2 | 1/1999 |
| EP | 1014103 | 6/2000 |
| EP | 1093318 A2 | 4/2001 |
| EP | 1043861 B1 | 6/2002 |
| JP | 5211470 A | 8/1993 |
| JP | 10285640 A | 10/1998 |
| JP | 11122656 A | 4/1999 |
| JP | 2000180186 | 6/2000 |
| JP | 2001051042 A | 2/2001 |
| JP | 2001083229 A | 3/2001 |
| JP | 2001177469 A | 6/2001 |
| JP | 2002516519 A | 6/2002 |
| JP | 2003047044 A | 2/2003 |
| JP | 2003078947 A | 3/2003 |
| JP | 2003520518 A | 7/2003 |
| JP | 2004512788 A | 4/2004 |
| JP | 2004253899 A | 9/2004 |
| JP | 2004535724 A | 11/2004 |
| JP | 2007020162 A | 1/2007 |
| JP | 2007529947 A | 10/2007 |
| JP | 2009521192 | 5/2009 |
| JP | 4809437 | 8/2011 |
| RU | 2286652 | 10/2006 |
| WO | 9815149 A1 | 4/1998 |
| WO | 9950968 A1 | 10/1999 |
| WO | 9960739 A1 | 11/1999 |
| WO | 0152566 | 7/2001 |
| WO | 0235877 A1 | 5/2002 |
| WO | 0241509 | 5/2002 |
| WO | 2007004788 A1 | 1/2007 |
| WO | 2007013850 A2 | 2/2007 |
| WO | 2007018408 A1 | 2/2007 |
| WO | 2007025138 A2 | 3/2007 |
| WO | 2007025143 A1 | 3/2007 |
| WO | 2007120326 A2 | 10/2007 |

OTHER PUBLICATIONS

Taiwan Search Report—TW097142148—TIPO—Feb. 7, 2012.

\* cited by examiner

FIGURE 2

| Pilot 400 | M A C | DO Pilot 98 | M A C | Pilot 400 | Pilot 400 | M A C | DO Pilot 96 | M A C | Pilot 400 |

↑ 220      ↑ 230      ↑ 240      ↑ 250

210

310

510

910

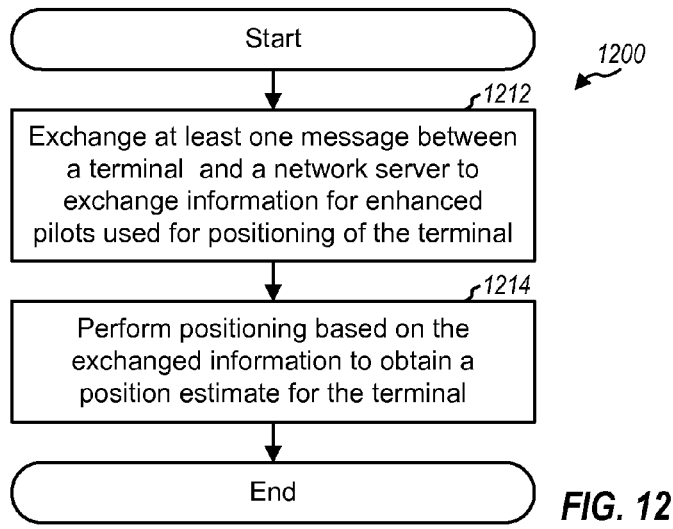
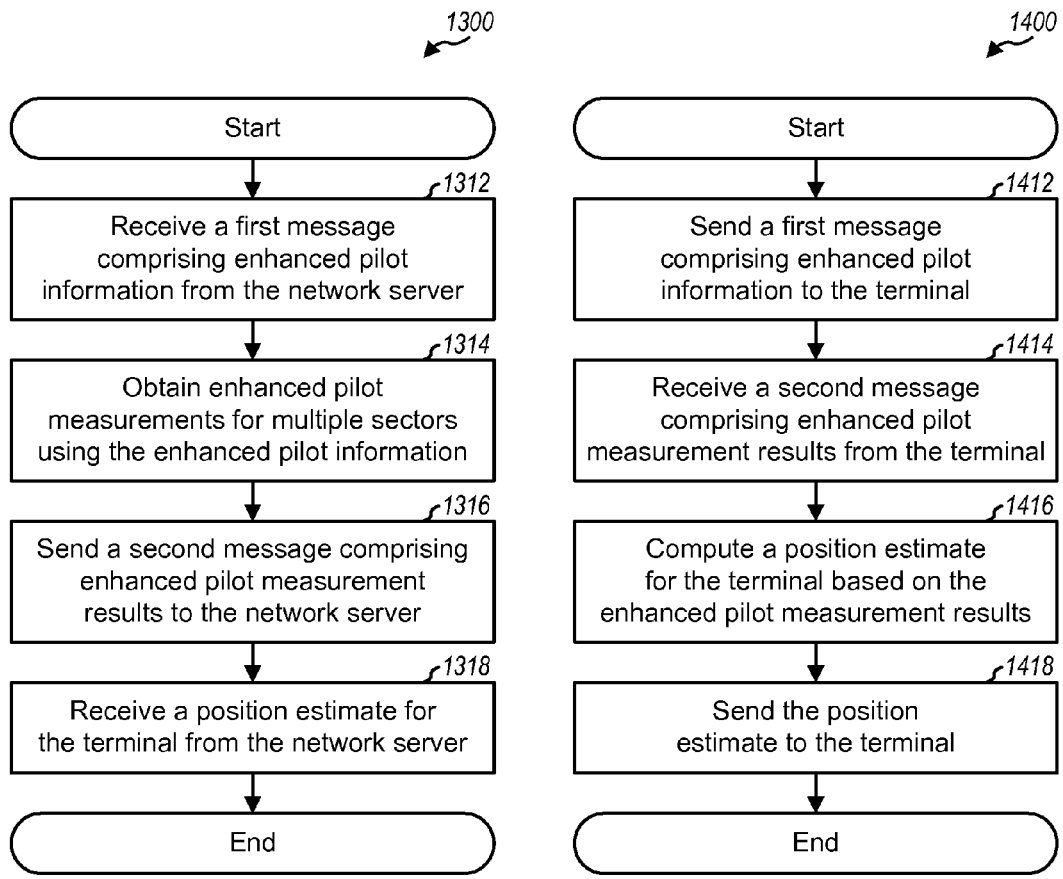
FIG. 12
FIG. 13
FIG. 14

POSITIONING USING ENHANCED PILOT SIGNAL

RELATED PATENT APPLICATIONS

This patent application is a continuation of U.S. patent application Ser. No. 12/259,253 filed on Oct. 27, 2008, which is a continuation-in-part of U.S. patent application Ser. No. 12/113,900 filed on May 1, 2008 and also claims priority to U.S. provisional Patent Application Ser. No. 61/016,101 filed on Dec. 21, 2007; U.S. patent application Ser. No. 12/113,900 claims priority to U.S. Provisional Patent Application Ser. No. 60/939,035, filed on May 18, 2007, U.S. Provisional Patent Application Ser. No. 60/978,068, filed on Oct. 5, 2007, U.S. Provisional Patent Application Ser. No. 61/014,706, filed on Dec. 18, 2007, U.S. Provisional Patent Application Ser. No. 61/038,660, filed on Mar. 21, 2008, and U.S. Provisional Patent Application Ser. No. 61/016,101, filed on Dec. 21, 2007; all of the above are assigned to the assignee hereof and incorporated herein by reference in their entireties.

FIELD

This disclosure relates to enhanced pilot signals for use in wireless communications or other systems.

BACKGROUND

Mobile stations or other receivers, such as, for example, cellular telephones, are beginning to include the ability to gather information that provides the ability to estimate position of the mobile station or other receiver. To have this capability, a mobile device, for example, may receive signals from a satellite positioning system (SPS), such as, for example, a Global Positioning System (GPS). Such information, perhaps in conjunction with other received information, may be employed to estimate position location. A variety of scenarios in which a mobile station or receiver may estimate position location are possible.

However, for a variety of reasons, a mobile station may encounter difficulties in receiving signals. For example, difficulties may be experienced if the mobile station is positioned inside of a building, or in a tunnel, etc. In other circumstances, a mobile station may not include an SPS receiver. Again, a variety of scenarios are possible. However, due at least in part to difficulties related to the ability of a mobile station to receive signals enabling it to estimate position location, a need exists for alternate ways for a mobile station or other device to estimate position location.

SUMMARY

Briefly, in accordance with one embodiment, a method of transmitting signals is provided. Signal waveforms are transmitted from at least two respective sectors. The at least two respective sectors are from at least two different sets of a superset of sectors. The transmitted signal waveforms include signal waveforms at least nearly mutually orthogonal at least along a particular signal dimension. An advantage of such an embodiment, for example, is reduced signal interference.

BRIEF DESCRIPTION OF THE FIGURES

Non-limiting and non-exhaustive embodiments are described herein with reference to the following figures:

FIG. 2 is a schematic diagram of an embodiment of a slot of a time division multiplexed signal transmission, such as may be employed in 1xEV-DO, for example, to implement enhanced pilot signaling.

FIG. 12 shows a process for performing positioning using enhanced pilots.

FIG. 13 shows a process performed by a terminal for positioning.

FIG. 14 shows a process performed by a network server for positioning.

DETAILED DESCRIPTION

Figure 1:
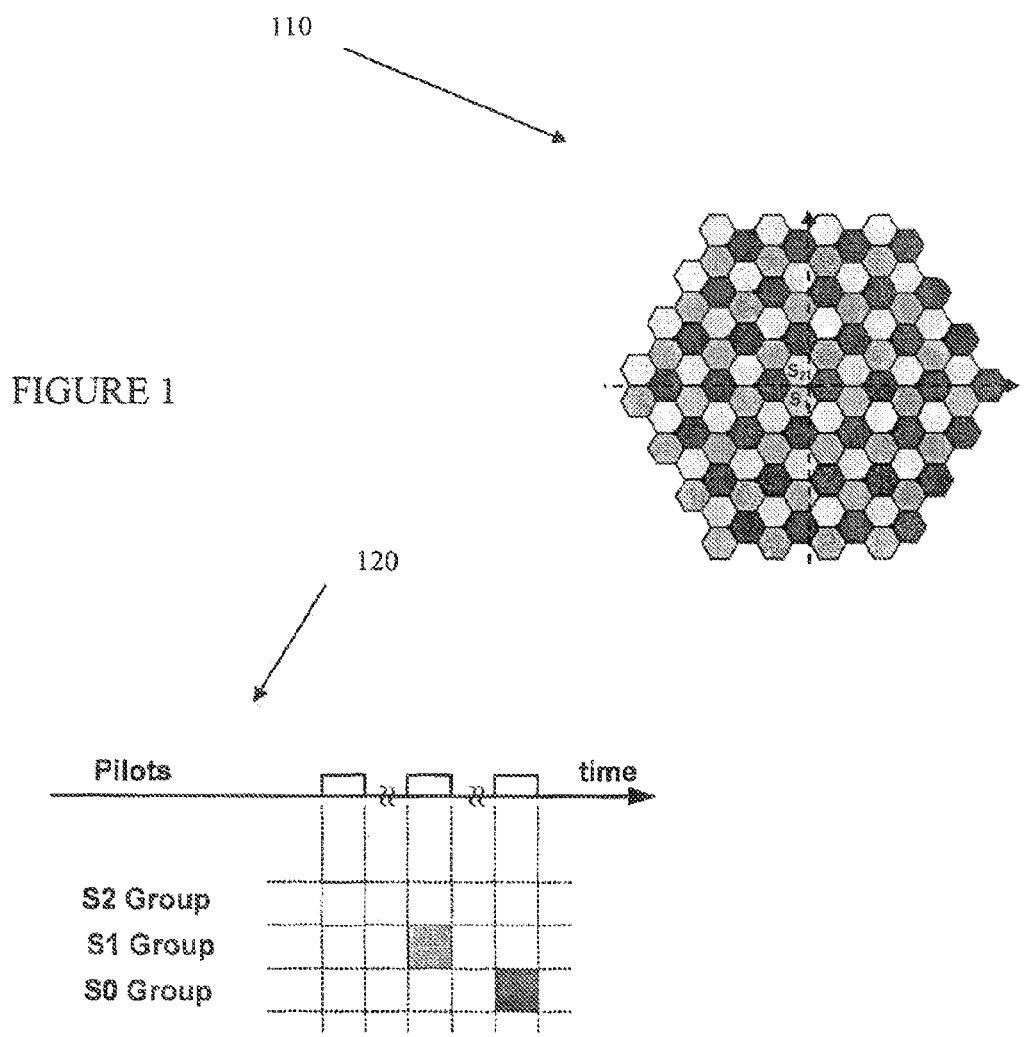
FIG. 1 is a schematic diagram illustrating an embodiment employing three time slots for enhanced pilot signaling.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Reference throughout this specification to one implementation, an implementation, one embodiment, an embodiment, or the like may mean that a particular feature, structure, or characteristic described in connection with a particular implementation or embodiment may be included in at least one implementation or embodiment of claimed subject matter. Thus, appearances of such phrases in various places throughout this specification are not necessarily intended to refer to the same implementation or to any one particular implementation described. Furthermore, it is to be understood that particular features, structures, or characteristics described may be combined in various ways in one or more implementations. In general, of course, these and other issues may vary with the particular context. Therefore, the particular context of the description or usage of these terms may provide helpful guidance regarding inferences to be drawn for that particular context.

Likewise, the terms, "and," "and/or," and "or" as used herein may include a variety of meanings that will, again, depend at least in part upon the context in which these terms are used. Typically, "and/or", as well as "or" if used to associate a list, such as A, B or C, is intended to mean A, B, or C, here used in the exclusive sense, as well as A, B and C. In addition, the term "one or more" as used herein may be used to describe any feature, structure, or characteristic in the singular or may be used to describe some combination of features, structures or characteristics.

Some portions of the detailed description which follow are presented in terms of algorithms or symbolic representations of operations on data bits or binary digital signals stored within a computing system memory, such as a computer memory. These algorithmic descriptions or representations encompass techniques used by those of ordinary skill in the data processing or similar arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical or magnetic signals capable of being stored, transferred, combined, compared or otherwise manipulated. It has proven convenient, at times, principally for reasons of common usage, to refer to these signals as bits, data, values, elements, symbols, characters, terms, numbers, numerals or the like. It should be understood, however, that all of these or similar terms are to be associated with the appropriate physical quantities and are intended to merely be convenient labels. Unless specifically stated otherwise, as apparent from the following discussion, it is appreciated that throughout this specification, discussions utilizing terms such as "processing", "computing", "calculating", "determining" or the like refer to the actions or processes of a computing platform, such as a computer or a similar electronic computing device, that manipulates or transforms data represented as physical electronic or magnetic quantities, or other physical quantities, within the computing platform's memories, registers, or other information storage, transmission, or display devices.

As previously indicated, a need exists for ways of estimating position location for a mobile station or other device. Although receiving satellite signals, as previously indicated, provides one approach; other approaches that may either supplement such signals or be employed instead of such an approach remain desirable.

In this context, the term mobile station is meant to refer to any device having the ability to receive wireless signals and send wireless signals, which is also capable of being mobile with respect to position location. A mobile station typically will receive signals in connection with usage as part of a wireless communications system. Furthermore, also typically, but not necessarily, a mobile station may communicate with one or more cells in a wireless communication system. Typically, such cells may comprise base stations. Therefore, it may be desirable for information gathered via base station communications to be utilized by a mobile station, sometimes referred to as a mobile, in estimating position location. Likewise, as indicated above, such information may supplement information available through other mechanisms, such as via satellite or via a position determining entity (PDE), for example.

However, a mobile station in communication with one or more base stations to gather information may encounter difficulties in some circumstances due to, for example, interference. For example, interference may occur between signals transmitted by several base stations. Thus, in this example, a mobile station may not be able to adequately communicate with one or more of the base stations, resulting in an inability or a reduced ability to perform an accurate position location estimate. This is sometimes referred to as the "hearability problem" due at least in part to the "near-far effect". For example, for wireless communications systems, such as cdma2000 and WCDMA, to provide without limitation only a few possible examples, downlink pilot signals may be difficult to detect due at least in part to such interference Although claimed subject matter is not limited in scope to any particular embodiment, in a variety of example embodiments, an approach to signal communications may be discussed to address at least in part the issues discussed above. In descriptions of such example embodiments, aspects of the signaling may relate to the time domain, the frequency domain or to other aspects of a particular signal, referred to here as signal dimensions. Nonetheless, it is intended that claims subject matter not be limited in scope to signaling in these example domains or signal dimensions. These examples are merely illustrative. For example, in other embodiments, instead of time or frequency, other dimensions of a signal may be involved, such as, for example, phase, amplitude, spreading code or spreading code sequence, signal energy or any combinations thereof. In this context, the term signal dimension is intended to refer to a quantifiable aspect of a signal that may vary across a variety of signals and that may be used to categorize or partition signals which vary from one another in this particular quantifiable aspect. Claimed subject matter is not intended to be limited to the specific example embodiments discussed. Rather, many other signaling techniques or signaling approaches that employ other signal dimensions are included within the scope of claimed subject matter. It is intended that the scope of claimed subject matter include all such techniques and approaches.

In one particular embodiment of a method of transmitting signals, for example, signal waveforms may be transmitted from at least two respective sectors of a wireless communications system. The at least two respective sectors, likewise, may be from at least two different sets of a superset of sectors. For example, a superset of sectors, such as illustrated in FIG. 1, as an example, may be divided into at least two, and as illustrated in FIG. 1, in some embodiments, more than two sets of sectors. Thus, in this particular embodiment, the sectors transmitting signals may be from separate sets of sectors. Likewise, in this particular embodiment, the signal waveforms transmitted may be at least nearly mutually orthogonal, at least along a particular signal dimension, such as, for example, time or frequency, as shall be discussed below in more detail. Although an implementation in which a single base station or sector transmits a location pilot during a particular time slot or other dimension provides the ability of a mobile station to discern signal characteristics, it likewise increases the time to acquire information from a desired number of base stations. Therefore, some implementations may implement reuse techniques. Cell sectors can be arranged as groups or sets, and different groups may transmit location pilots during different dedicated signal dimensions, such as different time slots, for example, for time multiplexed signals.

FIG. 1, for example, instead, illustrates an embodiment in which a superset of sectors are partitioned or divided into 3 sets, S0, S1, and S2, although, of course, claimed subject matter is not limited in scope in this respect. The arrangement of sectors is illustrated by 110 and the particular time slots in which those sectors may transmit enhanced pilot signals is illustrated by 120. As indicated above, this approach could be applied to a variety of signal dimensions, such as, for example time and/or frequency, to provide only two out of more than two possible examples. However, for ease of explanation, we shall illustrate an example embodiment for the protocol 1xEV-DO, which employs uplink and downlink signal transmissions in which information is slotted into various time slots.

Protocol 1xEV-DO is part of a family of CDMA2000 1x digital wireless standards. 1xEV-DO is a third generation or "3G" CDMA standard. There are currently two main versions of 1xEV-DO: "Release 0" and "Revision A". 1xEV-DO is based on a technology initially known as "HDR" (High Data Rate) or "HRPD" (High Rate Packet Data), developed by Qualcomm. The international standard is known as IS-856.

FIG. 2 is one possible example embodiment 210 of a time division multiplexed (TDM) signal that may employ enhanced pilot signaling, although, of course, claimed subject matter is not limited in scope to this particular example. Embodiment 210 is intended to illustrate one enhanced pilot signal slot. In the 1xEV-DO downlink, a Pilot Channel is time division multiplexed with other channels. The Pilot Channel in this example is designated by 210-250. A 1xEV-DO downlink transmission includes time slots of length 2048 chips. Groups of 16 slots align with an offset pseudo-random noise or PN sequence. As illustrated by 210, within a slot, Pilot, enhanced media access control (MAC) and Traffic or Control Channels are time division multiplexed. Thus, for an embodiment of enhanced pilot signaling for a 1xEV-DO downlink, time slots may be allocated for enhanced pilot signals. Here, FIG. 2 illustrates one possible embodiment of such a slot structure, although, for course, claimed subject matter is not limited in scope to this example. Many other possible enhanced pilot signal configurations or structures are possible and are included within the scope of claimed subject matter.

For this embodiment, however, enhanced pilot channels or signals are transmitted in the data portion of these dedicated slots, while legacy Pilot and MAC channels are retained for backward comparability. For this embodiment, the enhanced pilot may appear as an unintended packet for legacy mobile stations, for example, that would not have the ability to recognize it. Likewise, for this embodiment, this slot may be transmitted with a relatively low "duty cycle", such as around 1% and still provide signaling benefits. In this way, potential impact on downlink capacity may not be significant.

An aspect of embodiments in accordance with claimed subject matter, such as the embodiment just discussed, relates to so-called "reuse". This term refers to the concept that signaling resources, such as frequency bandwidth or signal duration, for example, that may be available in a particular signaling dimension (or in several signaling dimensions in some embodiments) may be employed (or reemployed) by other or different sectors. For example, in the embodiment described above, dedicated time slots may be partitioned to correspond, for example, to the sets of sectors illustrated in FIG. 1. In this example, 3 non-overlapping partitions have been formed, although claimed subject matter is not limited in scope in this respect. Any number of groups, referred to here as K or as reuse factor 1/K may be employed and the sectors are not required to be non-overlapping. However, regardless of the details of this particular embodiment, a one-to-one association, by construction, may exist between the partitions of the dedicated time slots and the partitions of the sets of sectors of the superset. Sectors of a particular set may only transmit enhanced pilot signals in its associated slots. This is referred to as reuse over time, here, since in this embodiment signaling resources available along the time signaling dimension have been partitioned to correspond to the partitioned sets of sectors that together comprise the superset of sectors.

One advantage of the approach of this particular embodiment, as suggested previously, relates to a reduction in signal transmission interference. In other words, by partitioning sectors along a signal dimension so that the transmitted signal waveforms are nearly mutually orthogonal results in pilot signals that are more easily detected by a mobile station, for example.

Partitioning of sectors for ease of discussion may be referred to here as "coloring," although the use "colors" is, of course, not a necessary feature of claimed subject matter or even of this particular embodiment. Rather, the term "color" is intended here to identify partitions or partitioning. Thus, as described in more detail immediately below, "color" here, which merely designates a partition, which for a sector, for example, refers to a 2tuple, rather than the conventional notion of color. For example, and without limitation, if we let a cell take on a value from the set {Red, Green, Blue} (abbreviated as {R, G, B}), a sector may, in this example, take on a value from the set {R, G, B}x{α, β, γ}, where "x" stands for Cartesian product. Thus, in this example, the "color" of the cell influences the "color" of the sectors of that cell. Of course, it is appreciated that claimed subject matter is not necessarily restricted to partitioning by cells or sectors. For example, in alternative embodiments, other subdivisions or partitions may be employed. However, as indicated above, the color of a sector may be referred to as a 2tuple, for example (R, α) abbreviated as Rα, the first element, again, coming from the color of the cell to which the sector belongs. Based at least in part on the discussion above, it should now be apparent that the reuse factor for this particular example is K=9 or 1/9.

Figure 3:
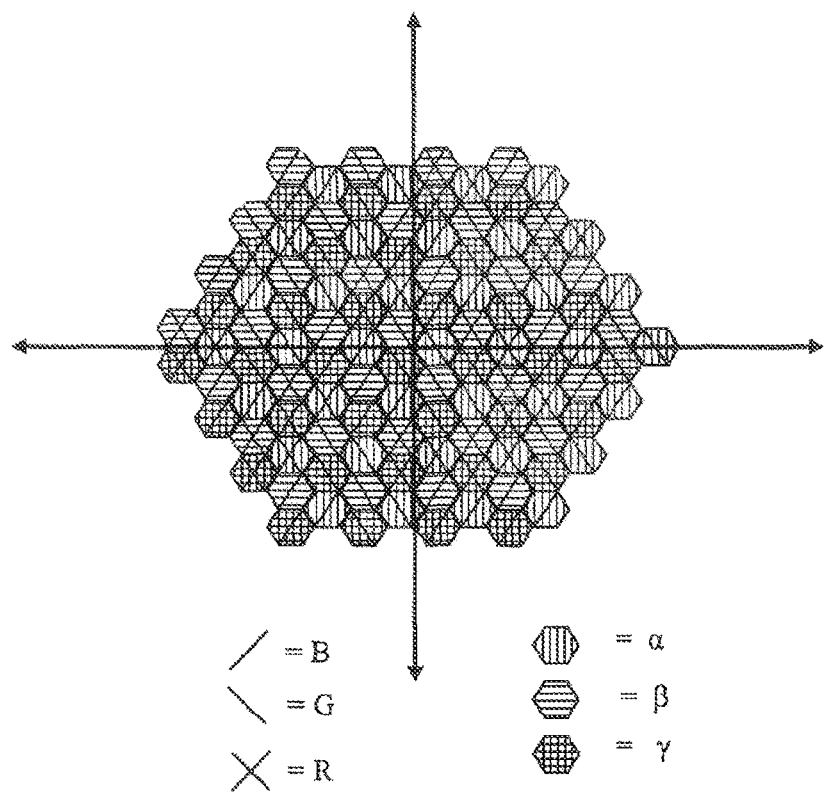
FIG. 3 is a schematic diagram illustrating an embodiment employing nine time slots for enhanced pilot signaling.
Figure 6:
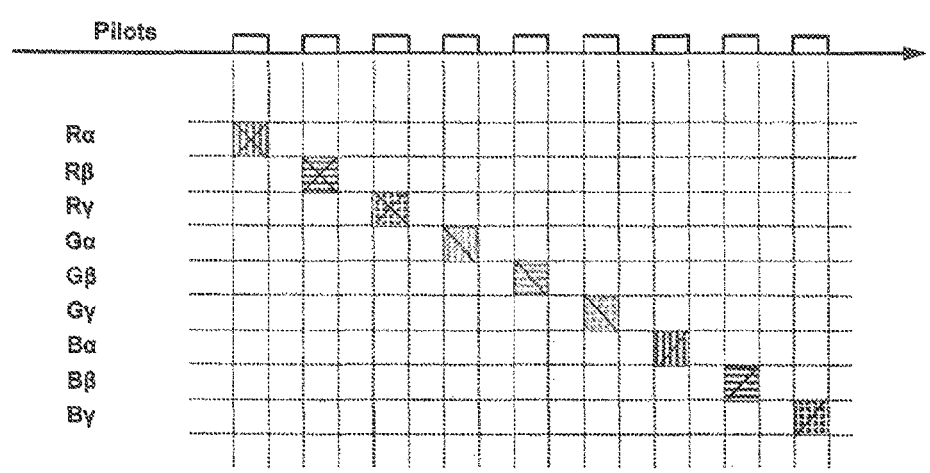
FIG. 6 is a table associated with the embodiment shown in FIG. 3.

An example embodiment 310 is shown in FIG. 3 that differs from the embodiment shown in FIG. 1. FIG. 3 also illustrates an example of planned or dedicated coloring. For the particular embodiment being discussed, transmitted signal waveforms comprise time division multiplexed (TDM) signal waveforms, as illustrated by 610 in FIG. 6. In planned coloring, colors are assigned in a fixed or dedicated manner so as to reduce interference among sectors of the same color in a balanced way, although, of course, claimed subject matter is not limited in scope to employing such an approach. Thus, as is illustrated by FIGS. 3 and 6, signals are transmitted in particular time slots so that potential signal interference is reduced. As may now be appreciated from the above discussion, dedicated resource and reuse reduces inter-channel interference, and thus assists to mitigate the near-far effect and likewise improve hearability. Therefore, for this particular embodiment at least, the TDM signal waveforms that are transmitted in dedicated time slots associated with particular cell sectors comprise highly detectable pilot (HDP) signals. As shall be discussed further below, this allows for improved terrestrial position location estimation accuracy, although, again, claimed subject matter is not limited in scope in this respect.

Another advantage of the embodiment described above, although claimed subject matter is not limited in scope in this respect, is the opportunity to implement a feature referred to in this particular context as incremental detection. Incremental detection here refers to the ability of a receiver portion of a mobile station to engage in a real-time trade-off between time and location position estimate accuracy by waiting to receive additional enhanced pilot signals that may improve position location accuracy.

For example, as described in connection with the example embodiment above, a mobile station that receives transmitted signal waveforms which include enhanced pilot signaling for one of 9 groups or sets of sectors has an option to wait to receive additional time slots which may include enhanced pilot signals for other groups or sets of sectors before computing a position location estimate. However, depending at least in part on a variety of factors, which may include the particular application, for example, a mobile station nonetheless may, if it is determined to be desirable, estimate position location without waiting to receive additional signals, thereby giving up additional "hearability" for less delay. The mobile station may more accurately estimate position location by receiving and processing additional enhanced pilot signals from other sectors of other sets or groups. For the embodiment illustrated in FIG. 6, as simply one example, without limitation, the mobile station or other receiver may perform a "position fix" by estimating location positions after receiving ⅓, ⅔ or all of the time slots dedicated to enhanced pilot signals in this particular embodiment. A longer delay before processing the signals should in general correspond to more detected base stations and, therefore, provide incrementally better detection estimates.

Although claimed subject matter is not limited in scope in this respect, for some embodiments, it may be desirable if the trade off described above were graceful or smooth. In one such embodiment, such as the embodiment shown in FIG. 3, again without limitation, a mobile station may be able to detect a reasonable number of base stations from all directions at relatively early times as a result of a particular transmission order employed. For example, a grouping or transmission strategy may be designed to allow a mobile station to detect base stations from different directions for particular amounts of delay. For example, for a group, the distribution of base stations about a particular point may be said to be radially symmetric. In the context of an assembly of base stations, a variation from strict radial symmetry may be expected, of course. Thus, a configuration need not be radially symmetric at all times, but may be approximately radially symmetric if averaged over time. Nonetheless, other embodiments other than the embodiment shown in FIG. 6 are possible and are intended to be included within the scope of claimed subject matter. Furthermore, claimed subject matter is intended to also cover those embodiments in which the trade-off may not be smooth or graceful or in which no trade off occurs.

For dedicated or planned coloring, it may be possible for the system or network to inform the mobile stations or terminals regarding the particular "color map". Alternatively, perhaps information may be loading in memory of a mobile station before the mobile station is deployed or perhaps a mobile station may determine the color map with respect to neighboring sectors through enhanced pilot signal detection over time. To reduce potential interference, it may, in at least some embodiments, be desirable that a sector or cell not share the same color with an immediately neighboring sector or cell. Likewise, if two neighboring sectors share the same PN sequence, it may assist in resolving ambiguity, in situations in which a mobile station may detect both sectors, if they do not share the same color, although, of course, claimed subject matter is not limited in scope in this respect.

Figure 4:
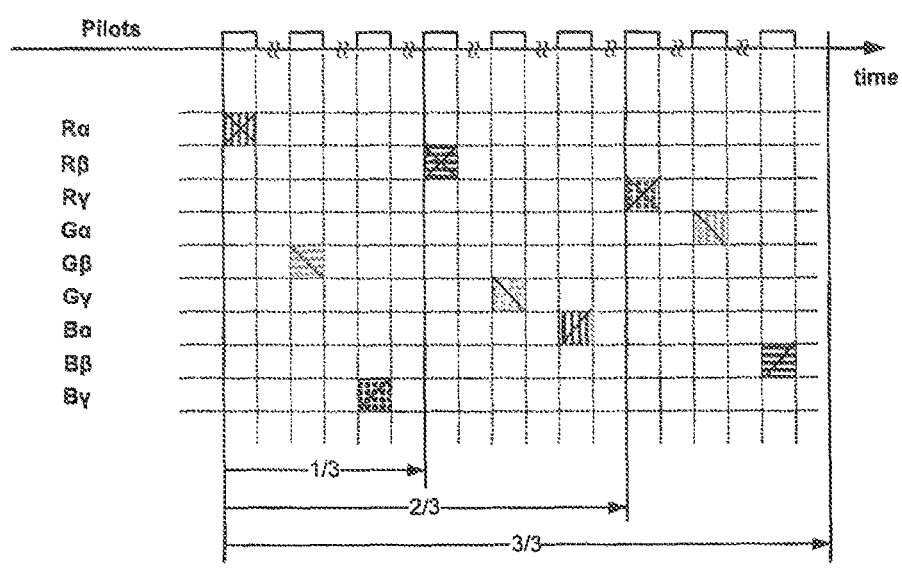
FIG. 4 is a schematic diagram illustrating another embodiment employing nine time slots for enhanced pilot signaling.
Figure 5:
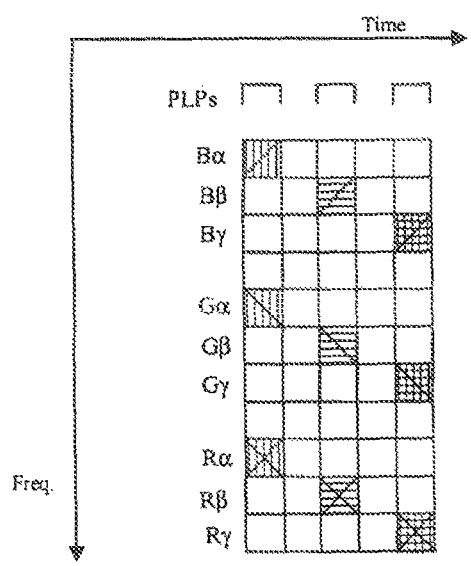
FIG. 5 is a schematic diagram illustrating an embodiment employing nine time-frequency slots for enhanced pilot signaling.

FIG. 4 is a schematic diagram illustrating embodiment 410, one of many possible embodiments in accordance with claimed subject matter that may be employed to provide enhanced pilot signals for 1xEV-DO. Here, color assignments are made to reduce interference among sectors of the "same color" in a balanced way, as suggested previously, for example. This particular embodiment employs planned or dedicated coloring, although, as made clear previously, claimed subject matter is not limited in scope to dedicated coloring. As shall be described in more detail below, other approaches may be employed within the scope of claimed subject matter.

Figure 9:
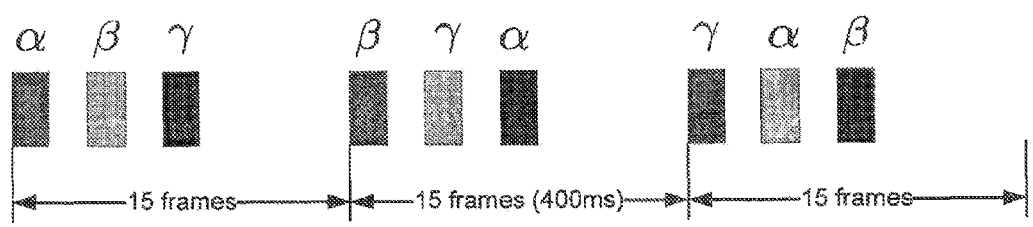
FIG. 9 is a schematic diagram illustrating an embodiment employing bursty time slot transmissions for enhanced pilot signaling.

Nonetheless, continuing with this particular embodiment, as illustrated in FIG. 9, three time slots may be reserved for every 256 time slots, resulting in an overhead of around 1%, as had been suggested previously. Slots 910 may be transmitted consecutively in one interlace, like a 3-slot packet, for example, although, of course, claimed subject matter is not limited in scope to "bursty" transmissions for enhanced pilot signaling. For example, a mobile station in an idle state may quickly leave the idle state to process such a burst and then go back to idle, potentially resulting in better detection power efficiency.

For this particular embodiment, a burst sequence is Red, Green, Blue, although, as illustrated, $\alpha$, $\beta$, and $\gamma$, change on successive bursts. Likewise, for this particular embodiment, a burst of 3 time slots cyclically shifts after 768 slots, although claimed subject matter is not limited in scope in this respect. An advantage of such an approach, however, is to resolve possible ambiguity that might occur in some situations. If, for example, a receiver can only detect enhanced signal pilots from one sector, without a cyclic shift, an ambiguity about which dedicated slot is being detected could be present.

Another possible feature that may accompany this particular embodiment would be to transmit these enhanced pilot signals with over-boosted power. This may lead to improved coverage; however, extra distortion is not likely since these times slots have a low peak to average power ratio. Likewise, it may be beneficial to code enhanced pilot signals using a different PN sequence than is used to code non-enhanced signals, such as DO pilot signals. One approach, without limitation, that may be relatively convenient to implement may involve using the PN sequence that corresponds to the complex conjugate of the sequence being applied by the base station to non-enhanced signals.

While dedicated or planned coloring provides potential advantages some of which are discussed above, color assignment to reduce interference among sectors may involve some amount of planning effort. If it were possible to reduce or avoid this effort, it may in some situations be advantageous. One approach may be to employ what may be referred to here as time varying coloring, rather than dedicated coloring. In time varying coloring, the color of various sectors may change with time. However, color assignment and/or transmission order may nonetheless be deterministic or non-deterministic (e.g., random or quasi-random). Thus, in some implementations, for example, color assignments for base stations may be fixed with transmission order being varied. Further, transmission order may change over time in a pre-determined way, or in a pseudo-random way. However, in other implementations, transmission order may be fixed with color assignments being varied. Here, again, color assignments may change in a pre-determined way, or in a pseudo-random way.

For example, again, but without limitation, for ease of discussion, assume a system employs time multiplexed signals, although, as previously indicated, many other approaches may be employed, such as FDM, OFDM, etc. Also, assume such a system may employ a non-dedicated scheme, such as a random or time-varying scheme. In a non-dedicated scheme employing random coloring, for example, a pseudo-random process may be employed to make color assignments to sectors, for this particular embodiment, for example. Likewise, if the mobile station has the particular pseudo-random process and the initial seed, for example, it may determine the particular association at any given point. Thus, enhanced pilot signals corresponding to sectors of interest may be detected by time slot, thereby reducing computational complexity for the mobile station. It is worth noting here, that for some embodiments, it may be desirable for two sectors capable of being detected by a mobile station sharing a PN sequence to not share the same seed. This may resolve ambiguity in situations in which the mobile station may detect both sectors. Of course, a similar pseudo-random approach as just described may likewise be employed in an embodiment in which the enhanced pilot signals are FDM signals, for example. Again, by applying the same pseudo-random process starting with the same seed, for example, the mobile station is able to determine the selected frequencies corresponding to selected sectors of interest and check those frequencies as part of a signal detection process, thereby reducing processing to perform such computations.

One particular example of random coloring is described in more detail below. In this particular embodiment, colors of various sectors are assigned pseudo-randomly. Thus, here, for this particular embodiment, the color of a sector varies with time in a pseudo-random manner, where here the term color refers to the 2tuple discussed previously. For example, assume, as previously, that an enhanced pilot signal is partitioned into nine time slots to correspond with nine sets or groupings of sectors that together form a superset, as previously discussed. In one particular embodiment, a particular cell, for example, may generate a pseudo-random integer between 0 and 8, which may then be mapped to a color. Sectors within a cell may be numbered 0, 1, 2 . . . . The color determined pseudo-randomly for the particular cell may, for example, be assigned to sector 0 in this particular embodiment. The other sectors within the cell may then be colored in such a manner that sectors 0, 1, 2, . . . follow the sequential order of α, β, γ with wrap around. For example, if sector 0 has β assigned as a second element then, sector 1 has γ and sector 2 has α.

For this particular embodiment, any set of sectors, which represents a color group here, has ⅑ of the total sectors in the average sense. However, for a given realization of the pseudo-random color assignment, a particular set of sectors may have more or less than ⅑ of the sectors. For a static mobile station or receiver, random coloring may be beneficial since dedicated coloring for a static mobile station may result in interference that will generally produce less accurate position location estimates. Of course, by its nature, for random coloring, a cyclic shift, such as described above for a dedicated coloring embodiment, may be omitted.

Previously we discussed an embodiment of an enhanced pilot signal that illustrated features in which the signal waveforms comprise time division multiplexed or TDM signals. In particular, this was discussed in connection with the protocol 1xEV-DO. However, as previously discussed, many other signal dimensions may be employed so that a signal waveform transmitted is mutually orthogonal with other transmitted signal waveforms. For example, and as is well-known, it may be possible for signals to be mutually orthogonal along the frequency dimension, as in the case of frequency division multiplexed (FDM) signals. Likewise, communication systems exist that employ orthogonal frequency divisional multiplexing or OFDM. In this system, signals are modulated so that mutually orthogonal signal waveforms may be transmitted along both the time and frequency dimensions. This particular type of enhanced pilot signal shall be discussed in connection with two examples. One example is in connection with the WiMAX specification and another example is in connection with the LTE specification, both WiMAX and LTE specified hereinafter in more detail in connection with other similar wireless protocols or communications specifications.

In connection with WiMAX, for example, a number of possible approaches for enhanced pilot signaling may be envisioned. One such approach may use the feature that the first OFDM symbol in a downlink sub-frame in WiMAX is used for transmitting a preamble. The preamble is employed for synchronization, initial channel estimation and handoff. Specifically, OFDM symbols may be multiplexed in time and in frequency. Subcarriers in the OFDM symbol of the preamble may be partitioned into three groups of subcarriers, where a group of subcarriers is referred to as a subcarrier set. In a segmented frequency re-use situation, a sector may be assigned to a specific subcarrier set. For example, segmented frequency reuse may correspond to a situation where system bandwidth belongs to one radio frequency carrier and is divided among sectors. In an alternate implementation, a carrier set may still have three subcarriers, and one sector may be assigned to all three subcarriers of one carrier set. A disadvantage of employing preamble pilots for position location as just described is that as a mobile station approaches to a base station, it may provide strong interference to the base station and interfere with the base station's ability to detect other mobiles stations using the same subcarrier sets. In addition, the mobile station is far from the other base stations, and thus the other base stations may have difficulty detecting the mobile station.

WiMax uses a "zones" approach. A "zones" approach refers to a time division multiplexing within a frame. A frame may comprise different zones and zones may have different number of OFDM symbols. The standard allows new zones to be created. Therefore, in one embodiment intended to be compatible with WiMAX, an enhanced pilot signal may be transmitted in a new zone created for position location. As discussed previously for 1xEV-DO, here too overhead may be involved, such as below one percent, since the zone may have a low duty cycle as part of the DL frame.

The zone within a frame, in one embodiment, for example, may be the same for all base stations. Base stations may, therefore transmit PLP (Position Location Pilot) zone information as part of a downlink map information transmitted to receiving mobile stations. For identification purposes, a base station may use one of a set of possible sequences for the position location pilot. For example, Chu sequences, as have been used in other approaches, may be employed. Of course, to avoid confusion, different codes should be used to avoid having the position location pilot detected as the preamble or vice-versa.

Within this WiMAX zone approach, color-coding of cells may be handled as an extension of the approach previously described in connection with time division multiplexed signals. Thus, for a given position location zone, one color group of base stations transmits their position location pilots. Different base stations in a group use different sequences for its position location pilot. As illustrated previously for 1xEV-DO, this may be employed with K=3 or K=9, as examples. Likewise, in this manner, incremental detection also may be implemented.

One aspect of employing WiMAX is that enhanced pilot signals may be mutually orthogonal in the frequency and time signal dimensions as a result of the use of OFDM symbols. As illustrated by embodiment 610 in the FIG. 6, for example, a sectors may employ the first PLP zone, β sectors may employ the second PLP zone and γ sectors may employ the third PLP zone. Therefore, within a PLP zone specified for an a sector, different cell are reflected along the frequency signaling dimension. Likewise, a similar approach occurs for the β and γ sectors. Here, as before, it remains an option for a mobile station to employ incremental detection. Likewise, as previously described, dedicated "coloring" may be employed, as well as time-varying or random coloring.

One advantage of the latter approach is that modification of the standard is relatively small. Position location pilots/sequences may be defined for different bandwidth deployment scenarios. Likewise, various aspects of the uplink and downlink messages may be defined. For example, a new uplink message for reporting pilot detection results may be added, as well as new downlink messages to communicate neighboring base stations to the terminal. New media access control headers for reporting the results of pilot detection would be desirable to speed up the reporting. Nonetheless, it may be made fully backward compatible with currently planned employments of WiMax. Legacy WiMAX terminals that would not support the enhanced pilot signal approach would in effect ignore the position location pilot zone.

Similarly, the LTE specification may likewise adopt an approach for position location signaling specification similar to the approach previously described for WiMAX. Although there may be potential approaches to enhance presently specified PSC and SSC sequences and symbols to increase energy and, thus, likelihood of detection; nonetheless, there may be advantages to defining a pilot structure similar as that just described in connection with WiMAX involving position location pilots or PLP signaling.

In an embodiment in which dedicated pilots are employed for position location, cells may reserve some fraction of time for a position location pilot within the structure of the signals currently intended for LTE. More specifically, some RBs and some TIs may be employed for a position location pilot. Likewise, for the position location pilot, a cell may use one of 512 Chu sequences for identification purposes. Likewise, a cell may transmit PLPs with time or time-frequency re-use similar to the manner previously described. An example, PLP transmission is described in connection with U.S. patent application Ser. No. 12/113,810, titled "Position Location for Wireless Communications System," filed on May 1, 2008, by Attar et al.; herein incorporated by reference in its entirety and assigned to the assignee of the presently claimed subject matter. Thus, as described previously with WiMAX, re-use, incremental detection, dedicated coloring or random coloring may all be employed depending upon the particular implementation.

In yet another embodiment employing enhanced pilot signals, aspects of such enhanced pilot signals may be configurable, such as, without limitation, whether time slots are employed, which time slots, how frequently enhanced pilot signals are transmitted, etc. For example, in one embodiment, a service operator for a wireless communications system, for example, may specify values for configurable parameters based at least in part on the intended application. For example, mutually orthogonal aspects of transmissions of the signal waveforms are capable of being set to particular values or capable of being modified from particular values.

As alluded to previously, in some embodiments, a hybrid approach to position location may be employed. For example, while an enhanced pilot signal may be employed as part of a wireless communications system, it may be supplemented with other information available via signals received through other mechanism to determine position location. Likewise, determining a position location estimate need not be performed entirely at the mobile unit. It may, for example, include transmitting location information to an outside entity (e.g., a position determination entity).

Although claimed subject matter is not limited in scope in this respect, as one example embodiment, enhanced pilot signals may assist a mobile cell access point, such as, for example, a femto cell home access point, to obtain GPS timing information through access to both the internet and wireless communication signals. For example, assume enhanced pilot signals are available via 1xEV-DO, although, of course, claimed subject matter is not limited in scope to 1xEV-DO, as indicated previously.

A cell access point may receive wireless signals from a base station providing modulo 426.66 ms GPS time offset by a propagation delay. Of course, this received signal has a timing ambiguity from the "modulo" aspect of the signals employed. Likewise, propagation delay is attributable to the time for the signals to reach the access point from the base station. However, for this embodiment, an access point may have the ability to resolve the timing ambiguity and remove the propagation delay to determine GPS time using enhanced pilot signals.

Network time protocol, or NTPv4, for example, may provide a cell access point with UTC time. UTC time may be employed the resolve the ambiguity from the modulo time signal. To estimate and remove propagation delay, the home access point may obtain its own location and the base station location that transmitted the timing signal. These locations may be obtained using enhanced pilot signaling, as previously described. Thus, the access point may compute propagation delay and compensate for it to compute GPS time. Thus, this particular embodiment provides GPS time, but without GPS satellite assistance. In some circumstances, the ability to obtain GPS time without access to the satellite may be desirable.

As previously discussed, enhanced pilot signals may be provided in many forms, such as time segments, frequency bands, or time-frequency bins. In any of these latter examples, partitioning into K groups along one or more signaling dimensions, such as time, frequency, or time-frequency, for example, may be applied so that the partitions are orthogonal or nearly so. Likewise, a superset of sectors may also be partition into K sets or groups. As discussed previously with reference to a particular embodiment, a one-to-one association may be established between the orthogonal or nearly orthogonal partitions and the sector partitions. In such an embodiment, for a particular set of sectors, an enhanced pilot signal may be transmitted with the particular window of the particular one or more signaling dimensions that have been partitioned. Likewise, as discussed previously with reference to a particular embodiment, dedicated coloring or time varying coloring, such as random coloring, may be applied. Therefore, as has been previously discussed and illustrated with respect to particular embodiments, enhanced pilot signaling may be applied to OFDM systems, such as WiMAX, LTE, UMB, or other 4G approaches being developed, for example, by 3GPP or 3GPP2. Of course, again, these are examples and claimed subject matter is intended to cover more than OFDM systems as well.

Therefore, wireless communication or location determination techniques, such as, for example, the embodiments previously described, may be used for a host of various wireless communication networks. Without limitation, these include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement one or more radio access technologies (RATs) such as cdma2000, Wideband-CDMA (W-CDMA), or Universal Terrestrial Radio Access (UTRA), to name just a few radio technologies. Here, cdma2000 may include technologies implemented according to IS-95, IS-2000, or IS-856 standards. UTRA may include Wideband-CDMA (W-CDMA) or Low Chip Rate (LCR). A TDMA network may implement a radio technology such as Global System for Mobile Communications (GSM). An OFDMA network may implement a radio technology such as Evolved UTRA (E-UTRA), IEEE 802.11, IEEE 802.16 (also referred to as the WiMAX specification), IEEE 802.20, Flash-OFDM®, etc. UTRA, E-UTRA, and GSM are part of Universal Mobile Telecommunication System (UMTS). Long Term Evolution (also referred to as LTE or the LTE specification) is a release of UMTS that may use E-UTRA. UTRA, E-UTRA, GSM, UMTS and LTE are described in documents that may be obtained from the 3rd Generation Partnership Project (3GPP). Cdma2000 is described in documents that may be obtained from the 3rd Generation Partnership Project 2 (3GPP2). 3GPP and 3GPP2 documents are, of course, publicly available.

Figure 7:
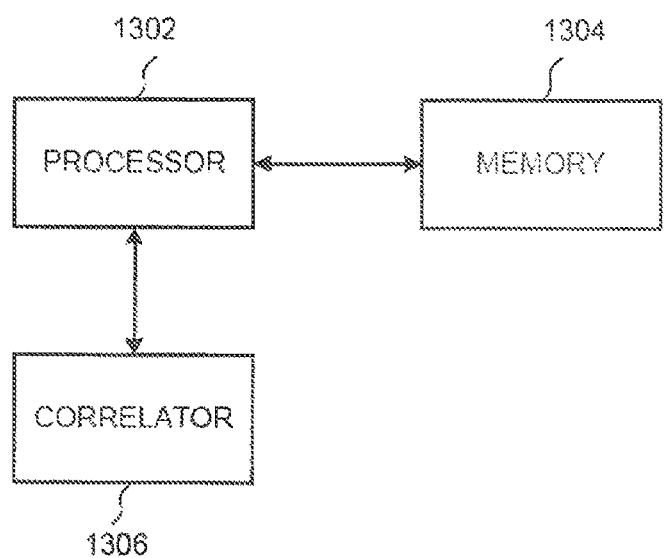
FIG. 7 is a schematic diagram illustrating an embodiment of a system for processing signals.

An example implementation of a system for processing signals is illustrated in FIG. 7. However, this is merely an example of a system that is capable of acquiring signals by processing according to a particular example and other systems may be used without deviating from claimed subject matter. As illustrated in FIG. 7, according to this particular example, such a system may comprise a computing platform including a processor 1302, memory 1304, and correlator 1306. Correlator 1306 may produce correlation functions or operations for signals provided by a receiver (not shown) to be processed by processor 1302, either directly or through memory 1304. Correlator 1306 may be implemented in hardware, firmware, software, or any combination. However, this merely an example of how a correlator may be implemented and claimed subject matter is not limited to this particular example.

Here, however, continuing with this example, memory 1304 may store instructions which are accessible and executable by processor 1302. Here, processor 1302 in combination with such instructions may perform a variety of the operations previously described, such as, for example, without limitation, correlating a PN or other sequence.

Figure 8:
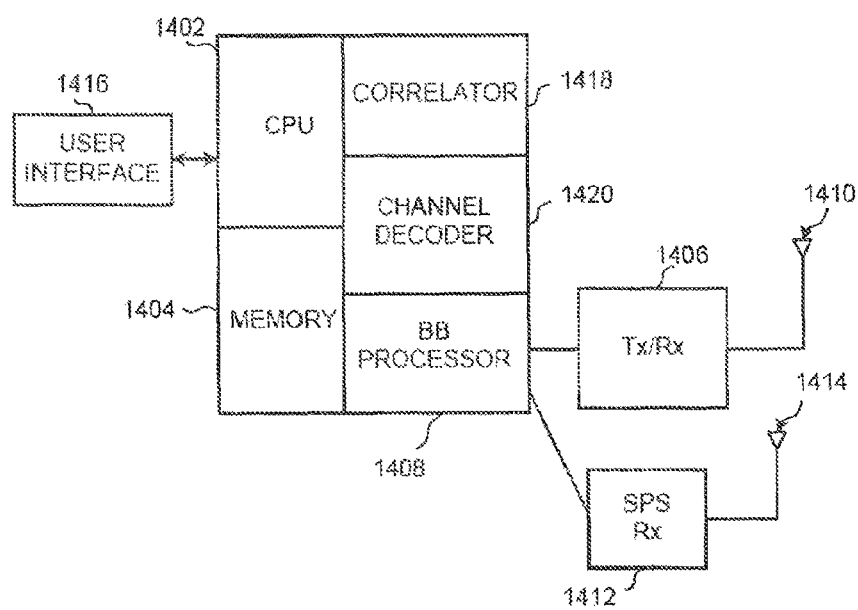
FIG. 8 is a schematic diagram illustrating an embodiment of a mobile station.

Turning to FIG. 8, radio transceiver 1406 may modulate a radio frequency (RF) carrier signal with baseband information, such as voice or data, or demodulate a modulated RF carrier signal to obtain baseband information. Antenna 1410 may transmit a modulated RF carrier or receive a modulated RF carrier, such as via a wireless communications link.

Baseband processor 1408 may provide baseband information from CPU 1402 to transceiver 1406 for transmission over a wireless communications link. Here, CPU 1402 may obtain such baseband information from an input device within user interface 1416. Baseband processor 1408 may also provide baseband information from transceiver 1406 to CPU 1402 for transmission through an output device within user interface 1416. User interface 1416 may comprise a plurality of devices for inputting or outputting user information, such as voice or data. Such devices may include, for example, a keyboard, a display screen, a microphone, or a speaker.

Here, SPS receiver 1412 may receive and demodulate SPS transmissions, and provide demodulated information to correlator 1418. Correlator 1418 may apply correlation functions from information provided by receiver 1412. For a given PN sequence, for example, correlator 1418 may produce a correlation function which may, for example, be applied in accordance with defined coherent and non-coherent integration parameters. Correlator 1418 may also apply pilot-related correlation functions from information relating to pilot signals provided by transceiver 1406. Channel decoder 1420 may decode channel symbols received from baseband processor 1408 into underlying source bits. In one example in which channel symbols comprise convolutionally encoded symbols, such a channel decoder may comprise a Viterbi decoder. In a second example, in which channel symbols comprise serial or parallel concatenations of convolutional codes, channel decoder 1420 may comprise a turbo decoder.

Memory 1404 may store instructions which are executable to perform one or more of processes or implementations, which have been described or suggested previously, for example. CPU 1402 may access and execute such instructions. Through execution of these instructions, CPU 1402 may direct correlator 1418 to perform a variety of signal processing related tasks. However, these are merely examples of tasks that may be performed by a CPU in a particular aspect and claimed subject matter in not limited in these respects. It should be further understood that these are merely examples of systems for estimating a position location and claimed subject matter is not limited in these respects.

In general, an enhanced pilot is a pilot designed to have lower interference (e.g., higher signal-to-noise ratio (SNR)) than a standard pilot and is suitable for use for positioning. An enhanced pilot may also be referred to as a location pilot, a position location (PL) pilot, a highly detectable pilot (HDP), etc. Lower interference for the enhanced pilots may be achieved by having only a subset of all sectors in a wireless network (e.g., a designated set of sectors) transmit the enhanced pilots in a given time slot or a given time frequency resource, as described above. Lower interference may also be achieved by having different sectors in the transmitting set use different pilot sequences.

A standard pilot is a pilot that may be available in a wireless network and may be used for sector detection, acquisition, and/or other purposes. A standard pilot may also be referred to by other names. For example, a standard pilot may be a "DO pilot" shown in FIG. 2 for a 1xEV-DO network, a preamble pilot in a WiMAX network, etc.

Sectors in a wireless network may transmit both standard pilots and enhanced pilots. For example, a sector in a 1xEV-DO network may transmit a standard pilot in the "DO pilot" fields in FIG. 2 and may transmit an enhanced pilot in pilot fields 220, 230, 240 and 250. A sector in a WiMAX network may transmit a standard pilot in a preamble and may transmit an enhanced pilot in a Pilot Location Pilot (PLP) zone. A sector may transmit a standard pilot at a designed rate and may transmit an enhanced pilot at a lower rate in order to reduce overhead, as described above.

A terminal or mobile station may receive standard pilots from a serving sector as well as nearby sectors. The terminal may also receive enhanced pilots from the serving sector, the nearby bases stations, and more distant sectors. The standard pilots from the serving sector and the nearby sectors may not observe high interference whereas the standard pilots from the more distant sectors may observe high interference. The high interference may prevent the terminal from accessing the more distant sectors and making measurements for such sectors for the purposes of obtaining a position estimate. In contrast, the enhanced pilots from both the nearby and more distant sectors may observe lower interference and may thus allow the terminal to make measurements for a larger number of sectors. A position estimate obtained with enhanced pilot measurements may have greater accuracy than a position estimate obtained with standard pilot measurements.

The enhanced pilots described herein may be used to estimate the location of terminals and for other purposes. The terms "location" and "position" are synonymous and are often used interchangeably. Positioning or location determination may be supported by user plane location architectures/solutions and control plane location architectures/solutions. A user plane location architecture is a location architecture that sends messages for location services (LCS) via a user plane. A control plane location architecture is a location architecture that sends messages for location services via a control plane. A user plane is a mechanism for carrying signaling for higher-layer applications and employing a user-plane bearer, which is typically implemented with protocols such as User Datagram Protocol (UDP), Transmission Control Protocol (TCP), and Internet Protocol (IP). A control plane is a mechanism for carrying signaling for higher-layer applications and is typically implemented with network-specific protocols, interfaces and signaling messages. Messages supporting location services are carried as part of signaling in a control plane architecture and as part of data (from a network perspective) in a user plane architecture. The content of the messages may, however, be the same or similar in both the user plane and control plane location architectures.

The enhanced pilots described herein may be used with various user plane location architectures such as Secure User Plane Location (SUPL) from Open Mobile Alliance (OMA), V1 or V2 user plane from CDMA Development Group (CDG), and X.50024 from 3GPP2. V1, V2 and X.50024 are applicable for 3GPP2 networks. SUPL is applicable for 3GPP and 3GPP2 networks. The enhanced pilots may also be used with various control plane location architectures such as 3GPP control plane described in 3GPP TS 23.271, TS 43.059 and TS 25.305, and 3GPP2 control plane described in IS-881 and 3GPP2 X.S0002. These user plane and control plane location architectures are described in publicly available documents. For clarity, certain aspects of the techniques are described below for SUPL, and SUPL terminology is used in much of the description below.

Figure 10:
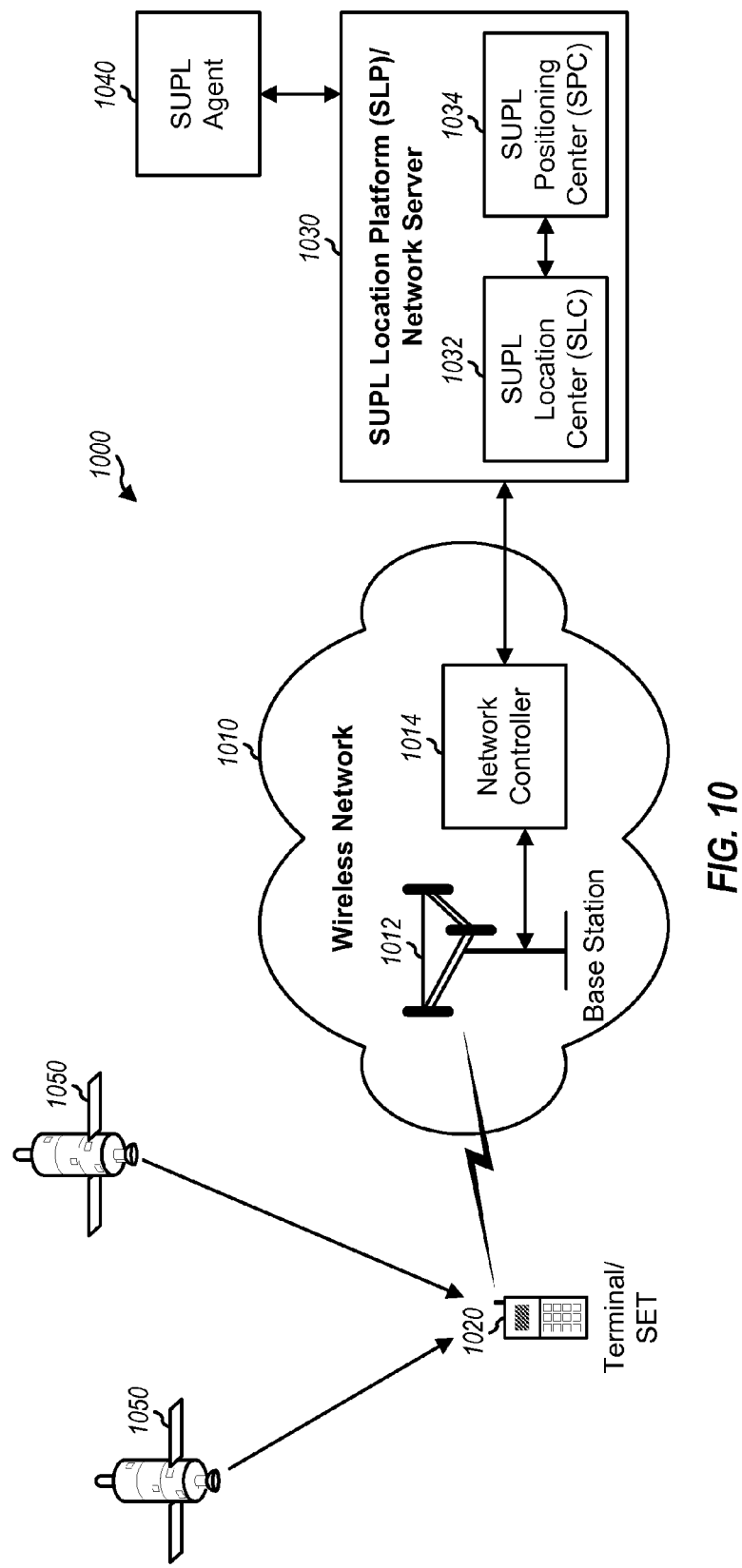
FIG. 10 shows a deployment supporting location services.

FIG. 10 shows an example deployment supporting location services using enhanced pilots. A terminal 1020 may communicate with a wireless network 1010 to obtain communication services. Wireless network 1010 may be a 3GPP2 cdma2000 1xRTT (or "1x") network, a 3GPP2 cdma2000 EV-DO (or "1xEV-DO") network, a WiMAX network, a 3GPP UMTS network, a 3GPP LTE network, a 3GPP2 UMB network, a WLAN, etc. Wireless network 1010 may include base stations and other network entities. For simplicity, only one base station 1012 and one network controller 1014 are shown in FIG. 10. Base station 1012 may provide communication coverage for a particular geographic area. The overall coverage area of base station 1012 may be partitioned into multiple (e.g., three) smaller areas. In 3GPP2, the smallest coverage area of a base station may be referred to as a "sector" or a "cell sector", and the overall coverage area of the base station may be referred to as a "cell". In 3GPP, the smallest coverage area of a base station may be referred to as a "cell". A "sector" in 3GPP2 may thus be equivalent to a "cell" in 3GPP. For clarity, 3GPP2 concept of "sector" and "cell" is used in the description below. Network controller 1014 may couple to a set of base stations, provide coordination and control for these base stations, and support transfer of voice, data and signalling traffic for terminals such as terminal 1020.

Terminal 1020 may be referred to as a SUPL Enabled Terminal (SET) in SUPL. The terms "terminal", "mobile station" and "SET" may be used interchangeably. Terminal 1020 may receive and measure signals (e.g., enhanced pilots and/or standard pilots) from different sectors within wireless network 1010 to obtain timing and/or signal strength measurements for the sectors. The timing and/or signal strength measurements and the known locations of the sectors may be used to derive a position estimate for SET 1020. A position estimate may also be referred to as a location estimate, a position fix, etc. Terminal 1020 may also receive and measure signals from satellites 1050 to obtain pseudo-range measurements for the satellites. Satellites 1050 may be part of the United States Global Positioning System (GPS), the European Galileo system, the Russian GLONASS system, or some other satellite positioning system (SPS) or global navigation satellite system (GNSS). The pseudo-range measurements and the known locations of satellites 1050 may be used to derive a position estimate for terminal 1020. In general, a position estimate may be derived based on measurements for sectors and/or satellites and using one or a combination of positioning methods.

A SUPL Location Platform (SLP) 1030 may communicate with terminal 1020 to support location services. Location services may include any services based on or related to location information. Location services may include positioning, which is a process to determine a position estimate for a terminal. SLP 1030 may be separate from, or part of, wireless network 1010. SLP 1030 may include a SUPL Location Center (SLC) 1032 and a SUPL Positioning Center (SPC) 1034. SLC 1032 may perform various functions for location services, coordinate the operation of SUPL, and interact with SETs over user plane bearer. SLC 1032 may perform functions for privacy, initiation, security, roaming support, charging/billing, service management, location calculation, etc. SPC 1034 may support positioning for SETs and delivery of assistance data to the SETs and may also be responsible for messages and procedures used for location calculation. SPC 1034 may perform functions for security, assistance data delivery, reference retrieval, location calculation, etc. SLP 1030, SLC 1032 and SPC 1034 may also be referred to by other names. For example, SLP 1030 may also be referred to as a location server, Location Information Server (LIS), a network server, etc. SLC 1032 may also be referred to as a Mobile Positioning Center (MPC), a Position Server (PS), a Gateway Mobile Location Center (GMLC), etc. SPC 1034 may also be referred to as a Position Determining Entity (PDE), Serving Mobile Location Center (SMLC), a Standalone SMLC (SAS), etc.

A SUPL agent 1040 may communicate with SLP 1030 to obtain location information for terminal 1020. A SUPL agent is a service access point or a location client that accesses network resources to obtain location information. Location information may comprise a position estimate and/or any information related to location. Terminal 1020 may also have a resident SUPL agent. Terminal 1020, SLP 1030, and SUPL agent 1040 may each support any SUPL version. SUPL Version 2.0 (SUPL 2.0) is described in OMA-AD-SUPL-V2, entitled "Secure User Plane Location Architecture," and OMA-TS-ULP-V2, entitled "UserPlane Location Protocol." These SUPL documents are publicly available from OMA.

Terminal/SET 1020 may communicate with SLP 1030 to obtain location service. The location service may be initiated by SET 1020 or by SUPL agent 1040.

Figure 11:
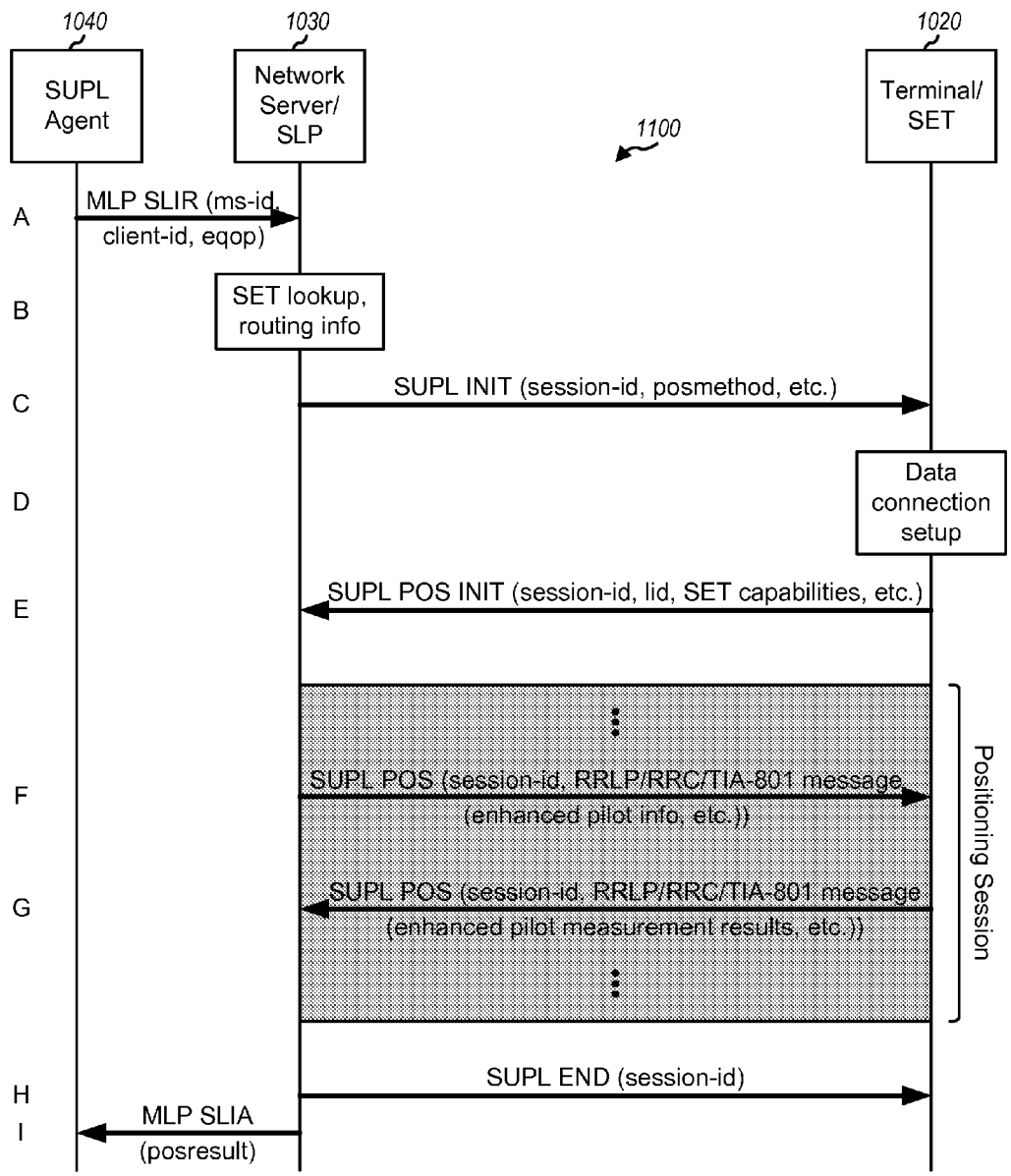
FIG. 11 shows a call flow for network-initiated location service.

FIG. 11 shows a design of a call flow 1100 for network-initiated location service using enhanced pilots for positioning. SUPL agent 1040 may desire location information for SET 1020 and may send a Mobile Location Protocol (MLP) Standard Location Immediate Request (SLIR) message to SLP 1030 (step A). SLP 1030 may authenticate and authorize SUPL agent 1040 for the requested location information. SLP 1030 may then obtain routing information for SET 1020 (step B).

SLP 1030 may send a SUPL INIT message to initiate a SUPL session with SET 1020 (step C). The SUPL INIT message may include a session-id used to identify the SUPL session, an intended positioning method (posmethod), the desired quality of positioning (QoP), etc. Upon receiving the SUPL INIT message, SET 1020 may perform a data connection setup procedure, attach itself to a packet data network (e.g., wireless network 1010) if SET 1020 is not already attached, and establish a secure IP connection to SLP 1030 (step D). SET 1020 may then send a SUPL POS INIT message to SLP 1030 to start a positioning session (step E). The SUPL POS INIT message may include the session-id, a location-id (lid) identifying the current serving sector of the SET, the SET capabilities (e.g., positioning capabilities), etc.

If a position estimate for SET 1020 is needed, then SLP 1030 and SET 1020 may exchange messages for a positioning session. SLP 1030 may send a SUPL POS message, which may carry a message for a positioning protocol such as Radio Resource LCS Protocol (RRLP) described in TS 44.031, Radio Resource Control (RRC) described in TS 25.331, or TIA-801 described in 3GPP2 C.S0022 (step F). As used herein, "TIA-801" includes all versions of TIA-801, including TIA/EIA/IS-801, TIA-801-A and TIA-801-B. The RRLP/RRC/TIA-801 message may include enhanced pilot information, which may be used by SET 1020 to measure enhanced pilots from different sectors. SET 1020 may also send a SUPL POS message, which may carry a RRLP/RRC/TIA-801 message containing enhanced pilot measurement results and/or other information (step G). In general, SLP 1030 may or may not send the SUPL POS message in step F, e.g., depending on whether the enhanced pilot information is needed by SET 1020. SET 1020 may or may not send the SUPL POS message in step G, e.g., depending on whether location calculation is performed by SET 1020 or SLP 1030. Each entity may send a SUPL POS message at any time during the positioning session. SET 1020 and SLP 1030 may also exchange other messages during the positioning session, which are not shown in FIG. 11 for simplicity.

For SET-assisted positioning, SLP 1030 may calculate a position estimate for SET 1020 based on pilot measurement results received from SET 1020. For SET-based positioning, SET 1020 may calculate a position estimate for itself based on assistance from SLP 1030. In any case, upon completing the positioning session, SLP 1030 may send a SUPL END message to SET 1020 (step H). SLP 1030 may also send the requested location information in an MLP Standard Location Immediate Answer (SLIA) message to SUPL agent 1040 (step I).

In general, the enhanced pilot information may comprise any information that may be useful to a terminal/SET in measuring enhanced pilots from different sectors. In one design, the enhanced pilot information may comprise one or more of the following:

Identification of sectors that transmit enhanced pilots,
Identification of time locations or time frequency resources (e.g., time slots in 1xEV-DO, enhanced pilot zones in WiMAX, etc.) in which the enhanced pilots are transmitted by the sectors,
Identification of pilot sequences used for the enhanced pilots,
Identification of sectors within each set of sectors and the enhanced pilot sequence used by each sector,
Location coordinates of each base station or sector,
Pilot timing differences between different base stations,
Approximate pilot measurement results for an estimated location of a terminal to assist measurement of weak pilot signals, and
Required or allowed measurement time for enhanced and/or standard pilots.

The enhanced pilot information may also include other information related to the enhanced pilots. The particular information to send to SET 1020 may be dependent on various factors such as how the enhanced pilots are generated, the partitioning of the sectors into sets, the network architecture, etc. SLP 1030 may send the enhanced pilot information to SET 1020 at the start of a positioning session, or only if requested by SET 120, or only if enhanced pilot measurement is supported by SET 120, or based on some other criteria.

In general, pilot measurement results may comprise any information that may be useful to compute a position estimate for a terminal/SET. In one design, the pilot measurement results may comprise one or more of the following:

Standard pilot measurement results, e.g., results for DO pilots in a 1xEV-DO network, preamble pilots in a WiMAX network, etc.,
Enhanced pilot measurement results,
Pilot measurement statistics, e.g., standard deviation for each pilot measurement, and
Other information such as the time the measurements were made, sector identification, etc.

The enhanced pilot measurement results may include timing measurements for detected enhanced pilots and/or enhanced pilots indicated by SLP 1030, signal strength measurements for the detected and/or indicated enhanced pilots, sector IDs of sectors transmitting the detected and/or indicated enhanced pilots, etc. The enhanced pilot measurement results may also include other information related to the enhanced pilots. For SET-assisted positioning, SET 1020 may obtain and send pilot measurement results to SLP 1030, which may compute a position estimate for SET 1020. For SET-based positioning, SET 1020 may obtain and use pilot measurement results to compute a position estimate for itself. Thus, SET 1020 may or may not send the pilot measurement results to SLP 1030.

In one design, the enhanced pilot information or the pilot measurement results may be sent in a message for a positioning protocol such as RRLP, RRC, or TIA-801. The RRLP/RRC/TIA-801 message may be carried in a SUPL POS message, which may be exchanged between SET 1020 and SLP 1030, e.g., as shown in FIG. 11. In another design, the enhanced pilot information or the pilot measurement results may be sent in (i) an existing SUPL message such as a SUPL POS INIT message or a SUPL REPORT message or (ii) a new SUPL message that is not currently defined in SUPL 2.0.

FIG. 12 shows a design of a process 1200 for performing positioning using enhanced pilots. Process 1200 may be performed by a terminal or a network server. The terminal may be a SET or some other entity. The network server may be an SLP or some other entity supporting location services. In any case, at least one message may be exchanged between the terminal and the network server to exchange information for enhanced pilots used for positioning of the terminal (block 1212). Positioning may then be performed based on the exchanged information to obtain a position estimate for the terminal (block 1214).

FIG. 13 shows a design of a process 1300 performed by the terminal for positioning. Process 1300 is one design of process 1200 in FIG. 12. The terminal may receive a first message comprising enhanced pilot information from the network server (block 1312). The enhanced pilot information may comprise identifiers of sectors transmitting the enhanced pilots, time locations of the enhanced pilots transmitted by the sectors, time and frequency locations of the enhanced pilots transmitted by the sectors, pilot sequences used by the sectors, locations of base stations for the sectors, pilot timing difference between the base stations, measurement time for the enhanced pilots, and/or other information.

The terminal may obtain enhanced pilot measurements for multiple sectors using the enhanced pilot information (block 1314). The terminal may send a second message comprising enhanced pilot measurement results to the network server (block 1316). The second message may further comprise standard pilot measurement results, pilot measurement statistics, etc. The terminal may thereafter receive a position estimate for itself from the network server (block 1318). The position estimate may be computed by the network server based on the enhanced pilot measurement results from the terminal.

FIG. 14 shows a design of a process 1400 performed by the network server for positioning. Process 1400 is another design of process 1200 in FIG. 12. The network server may send a first message comprising enhanced pilot information to the terminal (block 1412). The network server may receive a second message comprising enhanced pilot measurement results from the terminal (block 1414). The network server may compute a position estimate for the terminal based on the enhanced pilot measurement results (block 1416). The network server may then send the position estimate to the terminal and/or to a separate client such as a SUPL agent (block 1418).

FIGS. 13 and 14 show designs for SET-assisted positioning. SET-based positioning may be supported as described above and may involve a different message exchange between the terminal and the network server.

In one design, the network server may be an SLP, the terminal may be a SET, and the at least one message may be exchanged between the SET and the SLP during a SUPL session. The at least one message may be at least one SUPL message. The at least one message may also be for a positioning protocol (e.g., RRLP, RRC, or TIA-801) and may be carried in at least one SUPL message. In another design, the terminal and the network server may exchange the at least one message via a control plane location architecture.

In one design, the enhanced pilots may be transmitted by different sets of sectors in different sets of time slots, one set of time slots for each set of sectors. In another design, the enhanced pilots may be transmitted by different sets of sectors on different sets of time frequency resources, one set of time frequency resources for each set of sectors. In any case, the enhanced pilots may have lower interference and may allow the terminal to detect distant sectors. The sectors in the wireless network may transmit both the enhanced pilots and standard pilots to the terminals in the network.

Figure 15:
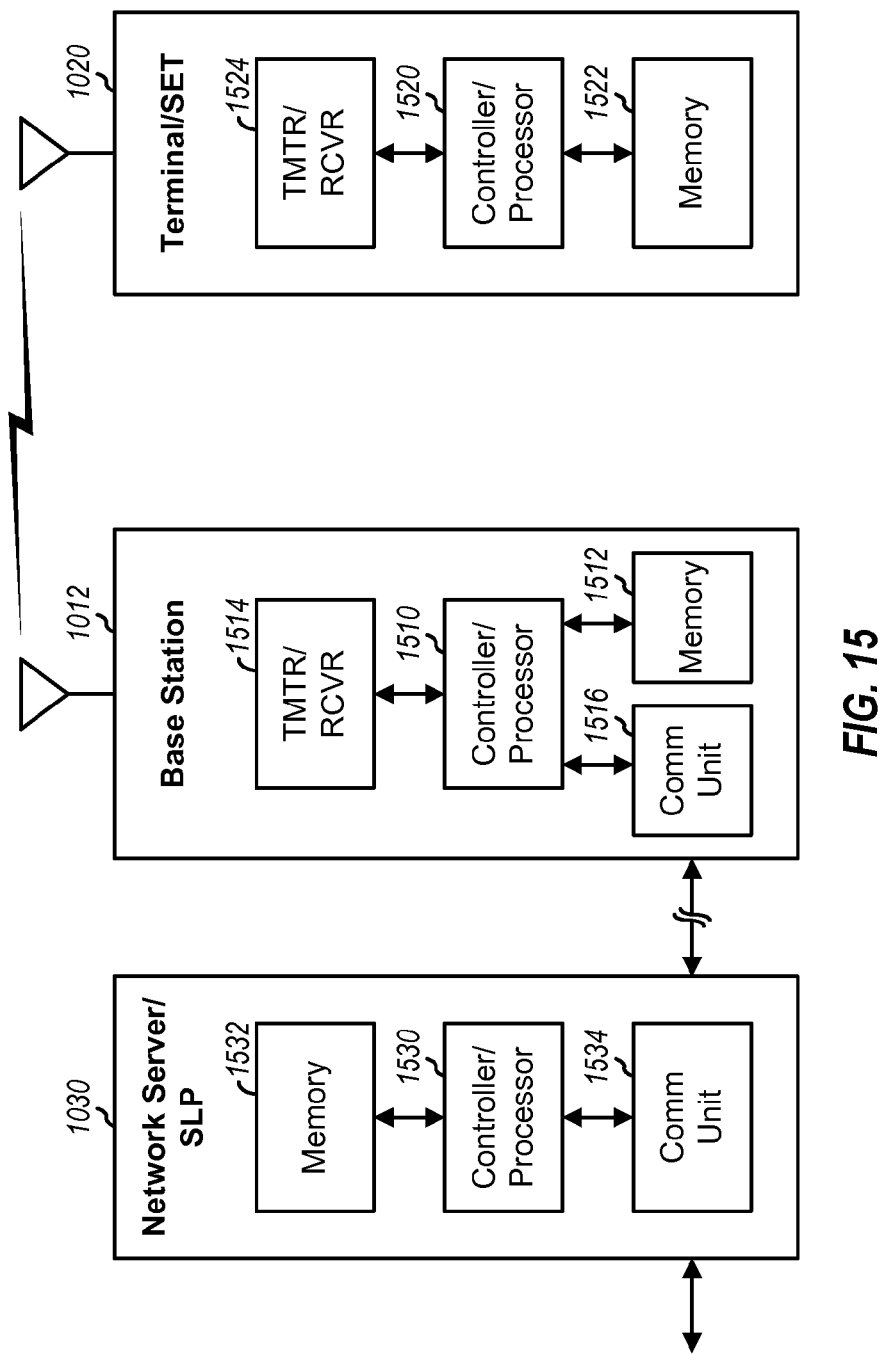
FIG. 15 shows a block diagram of a base station, a terminal, and a network server.

FIG. 15 shows a block diagram of a design of base station 1012, terminal/SET 1020, and network server/SLP 1030 in FIG. 10. For simplicity, FIG. 15 shows only one controller/processor 1520, one memory 1522, and one transmitter/receiver (TMTR/RCVR) 1524 for terminal 1020, only one controller/processor 1510, one memory 1512, one transmitter/receiver 1514, and one communication (Comm) unit 1516 for base station 1012, and only one controller/processor 1530, one memory 1532, and one communication unit 1534 for network server 1030. In general, each entity may include any number of processors, controllers, memories, transmitters/receivers, communication units, etc.

On the downlink, base station 1012 may transmit traffic data, signaling, and enhanced and standard pilots to terminals within its coverage area. These various types of information may be processed by processor 1510, conditioned by transmitter 1514, and transmitted on the downlink. At terminal 1020, downlink signals from base station 1012 and other base stations may be received and conditioned by receiver 1524 and further processed by processor 1520 to obtain various types of information. On the uplink, terminal 1020 may transmit traffic data, signaling, and pilot to base station 1012. These various types of information may be processed by processor 1520, conditioned by transmitter 1524, and transmitted on the uplink. At base station 1012, the uplink signals from terminal 1020 and other terminals may be received and conditioned by receiver 1514 and further processed by processor 1510 to obtain various types of information from the terminals.

Processors 1510 and 1520 may direct the operation at base station 1012 and terminal 1020, respectively. Processor 1520 may also perform process 1200 in FIG. 12, process 1300 in FIG. 13, and/or other processes for the techniques described herein. Processor 1520 may receive enhanced pilot information from network server 1030, send enhanced pilot measurement results to network server 1030, compute position estimates for terminal 1020, etc. Memories 1512 and 1522 may store program codes and data for base station 1012 and terminal 1020, respectively. Base station 1012 may directly or indirectly communicate with network server 1030 via communication unit 1516.

Within network server 1030, processor 1530 may perform processing to support location services for terminals. For example, processor 1530 may perform process 1200 in FIG. 12, process 1400 in FIG. 14, and/or other processes for the techniques described herein. Processor 1530 may send enhanced pilot information to terminal 1020, receive enhanced pilot measurement results from terminal 1020, compute position estimates for terminal 1020, etc. Memory 1532 may store program codes and data for network server 1030. Communication unit 1534 may allow network server 1030 to communicate with base station 1012, terminal 1020, and/or other network entities.

It will, of course, be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. The methodologies described herein may be implemented by various means depending upon the application. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory, for example, a memory of a mobile station, and executed by a processor, for example a microprocessor. Memory may be implemented within the processor or external to the processor. As used herein the term "memory" refers to any type of long term, short term, volatile, nonvolatile, or other memory and is not to be limited to any particular type of memory or number of memories, or type of media upon which memory is stored. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that if executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method of performing positioning using a network, comprising:
    determining signal dimensions for an enhanced pilot from enhanced pilot information associated with a plurality of enhanced pilots, wherein the plurality of enhanced pilots include one or both of:
        enhanced pilots transmitted by different sets of sectors in different sets of time slots, one set of time slots for each set of sectors; or
        enhanced pilots transmitted by different sets of time frequency resources, one set of time frequency resources for each set of sectors;
    receiving at a terminal the enhanced pilot information from the network; and
    performing positioning of the terminal based on results of enhanced pilot measurements for multiple sectors using the enhanced pilot information from the terminal to obtain a position estimate for the terminal.

2. The method of claim 1, wherein the determining signal dimensions for the enhanced pilot is performed at least in part by exchanging at least one message with a network server, and wherein the performing positioning comprises obtaining enhanced pilot measurements for enhanced pilots transmitted by multiple sectors using the enhanced pilot information.

3. The method of claim 2, wherein the enhanced pilot information comprises at least one of identifiers of sectors transmitting the enhanced pilots, time locations of the enhanced pilots transmitted by the sectors, time and frequency locations of the enhanced pilots transmitted by the sectors, pilot sequences used by the sectors, locations of base stations for the sectors, pilot timing difference between the base stations, and measurement time for the enhanced pilots.

4. The method of claim 2, further comprising determining one or more satellite pseudorange measurements based on one or more received satellite signals, wherein the exchanging at least one message comprises sending a message comprising enhanced pilot measurement results to the network server, and wherein performing positioning of the terminal based on the enhanced pilot to obtain a position estimate for the terminal comprises performing positioning based on the enhanced pilot and at least one of the one or more pseudoranges and receiving the position estimate from the server.

5. The method of claim 4, wherein the message further comprises at least one of standard pilot measurement results and pilot measurement statistics.

6. The method of claim 1, wherein performing positioning of the terminal based on the enhanced pilot to obtain a position estimate for the terminal comprises:
    sending a second message comprising enhanced pilot measurement results to a network server and receiving a position estimate for the terminal from the network server.

7. The method of claim 2, wherein the network server is a Secure User Plane Location (SUPL) Location Platform (SLP), wherein the terminal is a SUPL Enabled Terminal (SET), and wherein the at least one message is exchanged between the SET and the SLP during a SUPL session.

8. The method of claim 1, wherein sectors in a wireless communication network transmit both enhanced pilots and standard pilots to terminals in the network.

9. An apparatus for wireless communication, comprising:
    at least one processor configured to determine signal dimensions for an enhanced pilot from enhanced pilot information associated with a plurality of enhanced pilots, wherein the plurality of enhanced pilots include one or both of:
        enhanced pilots transmitted by different sets of sectors in different sets of time slots, one set of time slots for each set of sectors; or
        enhanced pilots transmitted by different sets of time frequency resources, one set of time frequency resources for each set of sectors;
    the at least one processor further configured to receive at a terminal the enhanced pilot information from a network, and to perform positioning of the terminal based on results of enhanced pilot measurements for multiple sectors using the enhanced pilot information from the terminal to obtain a position estimate for the terminal.

10. The apparatus of claim 9, wherein the at least one processor is configured to obtain enhanced pilot measurements for enhanced pilots transmitted by multiple sectors using the enhanced pilot information.

11. The apparatus of claim 9, wherein the at least one processor is configured to perform positioning of the terminal based on the enhanced pilot to obtain a position estimate for the terminal by sending a message comprising enhanced pilot measurement results to a network server and receiving a position estimate from the network server.

12. The apparatus of claim 11, wherein the at least one processor is configured to compute the position estimate for the terminal based on the enhanced pilot measurement results.

13. The apparatus of claim 9, wherein the network server is a Secure User Plane Location (SUPL) Location Platform (SLP), wherein the terminal is a SUPL Enabled Terminal (SET), and wherein the at least one message is exchanged between the SET and the SLP during a SUPL session.

14. An apparatus for wireless communication, comprising:
    means for determining signal dimensions for an enhanced pilot from enhanced pilot information associated with a plurality of enhanced pilots, wherein the plurality of enhanced pilots include one or both of:
        enhanced pilots transmitted by different sets of sectors in different sets of time slots, one set of time slots for each set of sectors; or
        enhanced pilots transmitted by different sets of time frequency resources, one set of time frequency resources for each set of sectors;

means for receiving at a terminal the enhanced pilot information from a network; and means for performing positioning of the terminal based on results of enhanced pilot measurements for multiple sectors using the enhanced pilot information from the terminal to obtain a position estimate for the terminal.

15. The apparatus of claim 14, wherein the means for determining signal dimensions for the enhanced pilot is performed at least in part by means for exchanging at least one message with a network server, and wherein the means for performing positioning comprises means for obtaining enhanced pilot measurements for enhanced pilots transmitted by multiple sectors using the enhanced pilot information.

16. The apparatus of claim 15, wherein the means for exchanging at least one message comprises means for sending a message comprising enhanced pilot measurement results to the network server.

17. The apparatus of claim 16, wherein the means for performing positioning comprises means for computing the position estimate for the terminal based on the enhanced pilot measurement results.

18. The apparatus of claim 14, wherein the network server is a Secure User Plane Location (SUPL) Location Platform (SLP), wherein the terminal is a SUPL Enabled Terminal (SET), and wherein the at least one message is exchanged between the SET and the SLP during a SUPL session.

19. A non-transitory computer-readable medium comprising:

code for causing at least one computer to determine signal dimensions for an enhanced pilot from enhanced pilot information associated with a plurality of enhanced pilots, wherein the plurality of enhanced pilots include one or both of:

enhanced pilots transmitted by different sets of sectors in different sets of time slots, one set of time slots for each set of sectors; or enhanced pilots transmitted by different sets of time frequency resources, one set of time frequency resources for each set of sectors;

code for causing at least one computer to receive at a terminal the enhanced pilot information from a network, and code for causing the at least one computer to perform positioning of the terminal based on results of enhanced pilot measurements for multiple sectors using the enhanced pilot information from the terminal to obtain a position estimate for the terminal.

20. The method of claim 1, wherein the signal dimensions include at least one of bandwidth, time, frequency, phase, amplitude, spreading code, spreading code sequence, signal energy or any combinations thereof.

21. The method of claim 1, wherein the network is an LTE network and the enhanced pilot is part of a positioning reference signal.

22. The method of claim 21, wherein the enhanced pilot is received in a plurality of orthogonal frequency divisional multiplexing (OFDM) symbols.

23. The method of claim 22, wherein the plurality of OFDM symbols is received in a downlink sub-frame.

24. The method of claim 23, wherein the downlink sub-frame is configured for the positioning reference signal.

25. The method of claim 24, wherein the downlink sub-frame configuration is specific to a cell.

26. The method of claim 25, wherein cell specific portions of the sub-frame are reserved for the transmission of positioning reference signals.

27. The method of claim 1, wherein the network is a CDMA2000 network and the enhanced pilot is a highly detectable pilot.

28. The method of claim 1, wherein the determining is performed by the terminal.

29. The method of claim 1, wherein the enhanced pilot is transmitted in a data portion of the signal.

* * * * *